US010343085B2

(12) United States Patent
Harp et al.

(10) Patent No.: US 10,343,085 B2
(45) Date of Patent: Jul. 9, 2019

(54) MULTILAYER POROUS COMPOSITE

(75) Inventors: Gary P. Harp, Newark, DE (US);
Marc Schroeter, Neubiberg (DE)

(73) Assignees: W. L. Gore & Associates, Inc.,
Newark, DE (US); W. L. Gore & Associates GmbH, Putzbrunn (DE)

( * ) Notice: Subject to any disclaimer, the term of this patent is extended or adjusted under 35 U.S.C. 154(b) by 980 days.

(21) Appl. No.: 13/273,926

(22) Filed: Oct. 14, 2011

(65) Prior Publication Data
US 2013/0092639 A1  Apr. 18, 2013

(51) Int. Cl.
| | |
|---|---|
| *F02M 37/24* | (2019.01) |
| *B01D 17/02* | (2006.01) |
| *B01D 17/04* | (2006.01) |
| *B01D 17/00* | (2006.01) |

(52) U.S. Cl.
CPC ....... *B01D 17/0202* (2013.01); *B01D 17/045* (2013.01); *B01D 17/085* (2013.01); *F02M 37/24* (2019.01)

(58) Field of Classification Search
CPC .......................... B01D 17/0202; F02M 37/221
USPC ....... 210/486, 799, 650, 651, 483, 488, 489, 210/490, 492, 505, 500.36
See application file for complete search history.

(56) References Cited

U.S. PATENT DOCUMENTS

| | | | |
|---|---|---|---|
| 3,368,681 A | * | 2/1968 | Kasten .......................... 210/114 |
| 3,953,566 A | | 4/1976 | Gore |
| 3,962,153 A | | 6/1976 | Gore |
| 4,437,986 A | * | 3/1984 | Hutchins ................ B01D 17/00 210/130 |
| 5,264,276 A | | 11/1993 | McGregor et al. |
| 5,350,515 A | | 9/1994 | Stark et al. |
| 5,462,586 A | | 10/1995 | Sugiyama et al. |
| 5,814,405 A | | 9/1998 | Branca et al. |
| 5,904,485 A | | 5/1999 | Siefert |
| 5,922,166 A | * | 7/1999 | Dillon ........................ 156/324.4 |
| 6,422,396 B1 | | 7/2002 | Li et al. |
| 6,461,513 B1 | | 10/2002 | Jen |
| 6,526,741 B2 | | 3/2003 | Whitehead et al. |
| 6,569,330 B1 | | 5/2003 | Sprenger et al. |
| 6,764,598 B2 | | 7/2004 | Yu et al. |
| 7,153,425 B2 | * | 12/2006 | Stankowski et al. ......... 210/335 |

(Continued)

FOREIGN PATENT DOCUMENTS

| | | |
|---|---|---|
| EP | 0017283 | 10/1980 |
| EP | 1256707 | 5/2002 |

(Continued)

OTHER PUBLICATIONS

Fellows, P. J., Food Processing Technology—Principles and Practice, 2009, Woodhead Publishing, 3rd ed., online version available at http://app.knovel.com/hotlink/toc/id:kpFPTPPE14/food-processing-technology (accessed Feb. 10, 2014), 1 page.*

(Continued)

*Primary Examiner* — Patrick J Orme
(74) *Attorney, Agent, or Firm* — Greenberg Traurig, LLP (57) ABSTRACT

A multilayer composite in which a nonwoven filter media layer is affixed to but separated from a hydrophobic microporous membrane such that the multilayer porous composite provides effective separation of water and particulate with substantial resistance to clogging in new fuels with low interfacial tensions.

37 Claims, 7 Drawing Sheets

SECTION B-B
SCALE 1:1

(56) References Cited

U.S. PATENT DOCUMENTS

| | | | |
|---|---|---|---|
| 7,285,209 B2 | 10/2007 | Yu et al. | |
| 7,306,729 B2 | 12/2007 | Bacino et al. | |
| 7,527,739 B2 | 5/2009 | Jiang et al. | |
| 7,938,963 B2 | 5/2011 | Klein et al. | |
| 2006/0006109 A1 | 1/2006 | Klein et al. | |
| 2006/0083882 A1 | 4/2006 | Schmitz et al. | |
| 2006/0163175 A1* | 7/2006 | Wiese | 210/774 |
| 2006/0231487 A1 | 10/2006 | Bartley et al. | |
| 2006/0277877 A1 | 12/2006 | Shields | |
| 2008/0053888 A1 | 3/2008 | Ellis et al. | |
| 2008/0105629 A1 | 5/2008 | Yang et al. | |
| 2009/0032475 A1* | 2/2009 | Ferrer et al. | 210/799 |
| 2009/0178970 A1 | 7/2009 | Stanfel et al. | |
| 2009/0250402 A1* | 10/2009 | Jiang et al. | 210/708 |
| 2010/0101984 A1 | 4/2010 | Roesgen et al. | |
| 2010/0132657 A1 | 6/2010 | Kiedaisch et al. | |
| 2010/0206796 A1* | 8/2010 | Lauer et al. | 210/232 |
| 2010/0206800 A1 | 8/2010 | Veit et al. | |
| 2010/0252510 A1* | 10/2010 | Godsay et al. | 210/806 |
| 2010/0326922 A1 | 12/2010 | Varanasi et al. | |
| 2011/0006017 A1 | 1/2011 | Wieczorek et al. | |
| 2011/0089101 A1 | 4/2011 | Girondi | |

FOREIGN PATENT DOCUMENTS

| | | |
|---|---|---|
| EP | 1 256 707 A2 | 11/2002 |
| JP | S63-156508 A | 6/1988 |
| JP | H04-313312 A | 11/1992 |
| JP | H07-256023 A | 10/1995 |
| JP | 2004-195418 A | 7/2004 |
| KR | 10-2005-0082455 | 8/2005 |
| WO | 2008/046707 A1 | 4/2008 |

OTHER PUBLICATIONS

Speight, James G., Crude Oil Assay Database, 2012; 2014, Knovel, online version available at http://app.knovel.com/hotlink/toc/id:kpCOAD0005/crude-oil-assay-database (accessed Feb. 10, 2014), 3 pages.*

Frazier Company Website I (http://www.frazierinstrument.com, accessed Jan. 29, 2014), 4 pages.*

Frazier Company Website II (http://www.frazierinstrument.com/products/fap/fap-faq.html, accessed Jan. 29, 2014), 5 pages.*

Green, Don, et al., Perry's Chemical Engineers Handbook, 2008, McGraw-Hill, 1 page.*

"Guidance and Summary of Information Regarding the RCRA Used Oil Rebuttable Presumption," EPA Publication No. 905-R03-005, Mar. 2005 (accessed Dec. 30, 2014), 47 pages.*

"Diesel Fuel Filtering, Cause, effect and solutions for contaminated fuel,"http://www.dieselfuelfilterings.com/process.cause.html (accessed Dec. 30, 2014), 2 pages.* http://www.powdertechnologyinc.com/products/test-dust/test-dust.php.

Filtration Solutions for High Pressure Common Rail Fuel Systems Barry Verdegan, Abby True-Dahl, William Haberkamp, Norm Blizard, David Genter, Eric Quillen American Filtration & Separation Society Annual Conference, (May 19-22, 2008), Valley Forge, PA.

Polymer Interface and Adhesion, CRC Press 1982 Chapter 5, Table 5.1 p. 170-171. ISBN 0824715330.

Emerging Challenges of Fuel Filtration in Filtration vol. 10, No. 2, 2010. pp. 105-115 ISSN 1479-0602 Debra Wolfgang, Andrew Dallas, Chuanfang Yang, Philip Johnson, Karthik Viswanathan, Mike Madsen, Brian Tucker, John Hacker.

International Search Report PCT/US2012/057560 dated Feb. 19, 2013.

* cited by examiner

MULTILAYER POROUS COMPOSITE

FIELD OF THE INVENTION

The present invention relates to multilayer porous composites useful for reliable fuel purification. More particularly, the invention relates to multilayer porous composites useful for consistent and reliable removal of particles, and durable removal of emulsified water, from middle distillate fuels such as diesel fuel, jet fuel, kerosene and similar fuels, including fischer tropsch fuels, biodiesel, and blends thereof.

BACKGROUND OF THE INVENTION

For a variety of economic, political, and environmental reasons there has been a drive for higher fuel efficiency, lower emissions, and more sustainable fuel sources. This drive has resulted in changes to fuel composition and chemistry of middle distillate fuels, new high precision engine designs, and the use of biofuels and blends thereof. These trends are discussed, for example, in "Filtration Solutions for High Pressure Common Rail Fuel Systems," Barry Verdegan, Abby True-Dahl, William Haberkamp, Norm Blizard, David Genter, and Eric Quillen, American Filtration & Separation Society Annual Conference, May 19-22 (2008), Valley Forge, Pa. As a consequence, new fuels often have higher water content, lower interfacial tension against water, and now readily form stable emulsions of very fine water droplets on shearing in transfer via pumping. In addition, newer precision engine designs are highly sensitive and easily damaged. The escalated water content in fuel when present in the form of free water droplets can reduce lubricity, thus causing damage. Furthermore, suspended particulates of a size from 4-20 microns and smaller can provide a significant source of abrasive wear. These factors generate a need for higher fuel purity requiring durable, long-lasting fuel filters, water separators, and the porous filter media composites that comprise them. These filters find use in a variety of applications where middle distillate fuels are used in combustion engines including, but not limited to: automotive, trucking, marine, and aerospace markets.

Filter media known to be applied for these applications include a wide variety of porous and composite materials. The porous composite media most commonly employed in practice are comprised of fibrous polymer non-wovens (non-wovens" as used herein are also referred to alternatively but equivalently as "nonwovens", cellulose or paper nonwovens including those containing microfiber glass, and textiles. Many of the aforementioned media also include hydrophobic coatings. Examples also exist of fibrous and non-fibrous microfilter membranes including fully and partially fluorinated polymers and expanded polytetrafluoroethylene (ePTFE).

However, these porous and composite materials fail to meet increased needs for durable, long-life, water and particulate separation. Specifically, there is a need for a porous composite capable of removing water and fine particulate to a purity level sufficient to protect new engines in the new fuel compositions and chemistries which include interfacial tension-lowering additives and surfactants. U.S. Pat. Nos. 5,904,845, 7,938,963, US20090178970 provide examples of attempts which include combinations of microfibrous composite non-wovens and textiles. These attempts fail to provide sufficient emulsified water removal in the presence of additives and surfactants in new fuels. In addition these attempts often include hydrophobic treatments that lack durability and are defeated over time. In contrast, ePTFE microfilters such as described in US patent application 2008/0105629 A1, can provide sufficient durable emulsified water removal, but are found to rapidly clog in the presence of particulate, thus reducing or eliminating liquid passage through the filter rendering the filter inoperable. In contrast, the ePTFE described by U.S. Pat. Nos. 6,764,598, and 7,285,209 is not always effective in preventing clogging and involves a complicated apparatus requiring recirculation to provide sweeping flow across the composite surface to delay clogging. Thus, known proposed solutions which employ ePTFE have issues related to clogging and are of limited practical use.

Significantly, much of the existing art regarding filtering water droplets from fuel involves the use of a "coalescer." A coalescer operates to remove water from fuel by allowing fine water droplets to pass through the material of the coalescer, but to encourage those fine droplets to merge, or coalesce, with one another. The water thus forms coarse particles or droplets which are then heavy enough to fall out of the fuel, for example by the force of gravity. This approach, which allows the water to flow through the material and encourages fine-to-coarse particle size progression in order to separate water from fuel actually teaches away from the present invention. In accordance with teachings of the present invention, both fine and coarse water droplets are rejected at the surface of a fine separating layer, rather than being allowed to pass through it.

SUMMARY OF THE INVENTION

Applicants have discovered that water and particulates can be efficiently and durably removed from a fuel stream when particles and droplets are filtered out of the stream in a coarse-to-fine progression. That is, when coarse particulate matter is filtered out of the fuel stream, such that a relatively particulate-free stream is presented to the water separator, the separation process is dramatically and surprisingly more effective and durable. The water separator of the present invention blocks the flow of even very fine water droplets, preventing them from continuing in the flow of the fuel stream, without passing them through the media and coalescing them into coarser particles.

The present invention provides a multilayer composite in which a nonwoven filter media layer is affixed to but separated from a hydrophobic microporous membrane by a distance such that the multilayer porous composite provides effective separation of water and particulate with substantial resistance to clogging in new fuels with low interfacial tensions. As used herein, a "composite" means a body comprised of two or more distinct materials. As used herein a "layer" means a body of finite thickness that can be substantially differentiated from an adjacent body based on solid material composition or solid structure. The materials include a "porous nonwoven filter media" used herein mean a body or mat comprised of plurality of fibers or microfibers or nanofibers or mixture thereof wherein the volume of the body is comprised of regions of both solid and fluid. The materials also include a "hydrophobic microporous membrane", used herein to include a porous polymeric film, preferably in conjunction with another support layer such as a non-woven material. "Hydrophobic" as used herein means the membrane having a base material with a solid surface energy or surface tension of less than 25 mN/m (or dynes/cm) determined via Zisman's method as described in Souheng. Wu "Polymer Interface and Adhesion" CRC Press 1982 Chapter 5 table 5.1 p. 170-171. ISBN 0824715330, incorporated herein by reference. "Microporous membrane" as used herein means a membrane having its largest pore size in the size range from 50 to 0.1 microns. The composite is multilayer meaning that it comprises no less than two layers. The composite layers are both fixed in space but separated from one another by a distance described by the volume adjacent to them divided by the surface area of the hydrophobic layer. As used herein "fixed" means the layers are mechanically held in place. The separation distance here is comprised of void space having significant non-solid composition.

In a further aspect of the invention, the applicants have discovered that it is critical that the surface of the microporous membrane, when embodied as a composite laminate of a membrane and a fiber non-woven, must face upstream toward the porous nonwoven filter media layer. Furthermore, the membrane face of the composite should be relatively unobstructed by the presence of a fine fiber non-woven. That is, when the microporous membrane comprises a laminate of a membrane and a non-woven, the membrane layer of the laminate must face upstream, and not the non-woven layer of the laminate. This discovery is in contrast to the teaching of US patent application 2008/0105629 A1, which does not specify a laminate orientation.

In a further aspect of the invention, it has been discovered that for effective function in separating emulsified water without clogging, the required distance between layers of the composite is described by the equation $$\frac{V}{SA} > \sqrt{\frac{C\mu}{\Delta\rho g}}$$

where V is the volume described by a body with a square or rectangular base defined by the filter area of the hydrophobic microporous membrane layer and a height equivalent to either the minimum linear distance between the layers or the average distance of separation between layers when the minimum separation distance is zero; SA is the filter surface area of geometric plane covering top most surface of the hydrophobic microporous membrane layer; C is a numeric constant equal to 0.01238 (meters/second); µ is the dynamic viscosity of the fluid in (grams/meters second); g is the gravitational constant 9.8 (meter/second squared); and Δρ is the difference in density between the middle distillate fuel and water phase in (gram/cubic meter).

In contrast to known composites which include microporous hydrophobic membranes, the composite described herein resists clogging by water and particles without the aid of sweeping flow across the composite surface. Here sweeping flow is defined as flow predominantly perpendicular to the plane of the filter surface. Moreover, the inventive composite of a filter media fixed separation and hydrophobic layer will not effectively function in the presence of sweeping flow across the filter media layer. Specifically, it has been found that the presence of the porous nonwoven layer upstream in the multilayer composite entrains water and negates not only the necessity, but also the positive effects, of sweeping flow across the surface of hydrophobic microporous membranes used for water separation in fuel.

DETAILED DESCRIPTION OF THE INVENTION

The invention relates to the use of multilayer composite in which a nonwoven filter media layer is fixed in space and separated from a hydrophobic microporous membrane by a distance described by a volume/average surface area of the composite layers such that the multilayer porous composite provides durable effective separation of water and particulate with substantial resistance to clogging in new fuels with low interfacial tensions. The invention includes the multilayer porous composites, the composite structures, and the method(s) of use in articles and applications of commerce.

Materials suitable to serve as a "porous filter media" can be any porous woven or non-woven material of organic or inorganic composition. Non-woven materials are preferred. If the non-woven is fibrous or microfibrous or nanofibrous it can contain other materials besides the fibers including fillers, binders, coatings, and/or lubricious coatings including, but not limited to those comprised of silicone or fluoropolymer dispersions. Suitable non-wovens include synthetic polymer, natural polymer, and inorganic or glass fibers. They can fall into the general classifications of non-wovens including but not limited to meltblown materials, spunbond materials, wet laid materials, electromeltblown materials, electrospun materials, and composites thereof. These non-wovens can be produced and processed by methods including, but not limited to melt extrusion, melt extrusion with air jets, solvent spinning, towing of fibers and yarns, carding, needle punching, hydroentanglement, fiber-splitting, wetlaying, drylaying, paste extrusion, perforation, stretching, and other means known to skilled practitioners in the arts of non-woven production.

Materials suitable to serve as hydrophobic microporous film may include, but are not limited to polytetrafluoroethylene (PTFE) and copolymers comprised of tetrafluoroethylene, hexafluoropropylene, with optional tertiary or quaternary monomers such as methyl, ethyl, or propyl perfluorovinylethers, vinylidene fluoride, ethylene and propylene. Examples of these materials include, but are not limited to materials described in the trade as tetrafluoroethylene/hexafluoropropylene copolymers (FEP), tetrafluoroethylene/perfluoroalkyl vinyl ether copolymers (PFA), and the like. More preferably, hydrophobic microporous film are those produced via of paste extrusion, melt extrusion, or a combination of these techniques, and subsequent stretching of the extrudate materials or composites thereof to produce microporous membranes. Preferably, these include filter materials comprised of microporous expanded PTFE, membranes thereof and laminates thereof as described in U.S. Pat. Nos. 3,953,566; 3,962,153; 5,814,405; 7,306,729 incorporated herein by reference. In alternative embodiments, the microporous membrane is a composite of a membrane layer (such as described above) and a support layer, such as a non-woven fiber.

To achieve effective function, the layers should be separated by an average distance described by the volume/surface area of the hydrophobic layer. Furthermore it has been discovered that this separation must fulfill the relation in the relation $$\frac{V}{SA} > \sqrt{\frac{C\mu}{\Delta\rho g}}$$

where V is the volume described by a body with a square or rectangular base defined by the filter area of the hydrophobic microporous membrane layer and a height equivalent either the minimum linear distance between the layers or the average distance of separation between the layers when the minimum separation distance is zero; SA is the filter surface area of geometric plane covering top most surface of the hydrophobic microporous membrane layer; C is a numeric constant equal to 0.01238 (meters/second); μ is the dynamic viscosity of the fluid in (grams/meters second); g is the gravitational constant 9.8 (meter/second squared); and Δρ is the difference in density between the middle distillate fuel and water phase in (gram/cubic meter). While the layers should be separated by the above described average distance, they may be touching or share one or more points of direct contact or attachment in space. In alternative embodiments, the layers are in the planar form disposed serially, or in tubular form disposed concentrically. Also alternatively, one or both of the layers are pleated.

The layers should be fixed or mechanically held in space. This may be accomplished by any means known in the art including, but not limited to, encapsulating the edges of the layered materials in a potting material or adhesive in caps or fixtures, attaching the layers to mechanically fixed rigid supports by lamination, or via the use of a molded, machined, extruded, lithographically printed, or other structural support spacer between the layers. Suitable compounds for potting or adhesives include polyurethanes, silicones, plastisols, epoxies, phenolics and other compositions known to skilled practicitioners of the art. Suitable materials for structural supports include aluminum, nylon, glass filled nylon, and other materials known to skilled practitioners of the art.

Figure 1:
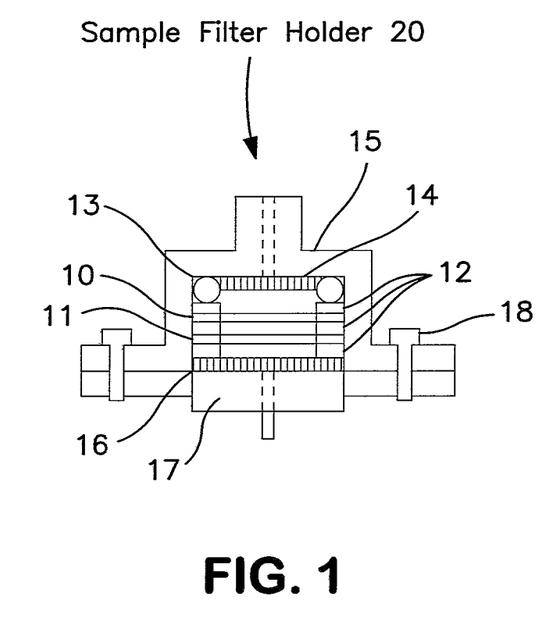
FIG. 1 is a side cross-sectional view of an exemplary embodiment of the present invention.

An exemplary embodiment of the present invention is illustrated in FIG. 1. In this exemplary embodiment, porous nonwoven filter media 10 (in this embodiment a cellulose non-woven) is disposed adjacent to hydrophobic microporous membrane 11 (in this embodiment a film of ePTFE laminated to a fiber non-woven) but separated therefrom by annular gasket 12. (Other optional components shown in FIG. 1 are in connection with the test apparatus described in Example 1 below.)

The following examples and comparative examples are intended to illustrate and explain the invention, but are not intended to limit it in any way. Rather, the invention is to be given the full scope defined in the appended claims.

EXAMPLES

Testing Methods
Interfacial Tension Measurement

Interfacial tension of test fuels against water was measured using Kruss K12 hardware bios version 4.04 running the Kruss Laboratory Desktop Software version 2.0.0.2207 using the DuNoy Ring Pull Method method. DuNoy ring immersions were conducted with flamed Kruss standard platinum ring and the software default dip parameters. RO Deionized water which had 18MO resistivity from a MIlliQ system was used for these tests.

Thickness Measurements

Membrane thickness was measured by placing the sample between the foot and pedestal of a thickness snap gauge (Mitutoyo, Aurora, Ill.).

Frazier Measurements

The Frazier permeability reading is the rate of flow of air in cubic feet per square foot of sample area per minute at a differential pressure drop across the test sample of 12.7 mm water column. Air permeability was measured by clamping a test sample into a circular gasketed flanged fixture which provided a circular opening of 17.2 cm diameter (232 square centimeter area). The upstream side of the sample fixture was connected to a flow meter in line with a source of dry compressed air. The downstream side of the sample fixture was open to the atmosphere. The flow rate through the sample was measured and recorded as the Frazier number.

Bubble Point Measurements

The bubble point and mean flow pore size were measured according to the general teachings of ASTM F31 6-03 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert (Mott Metallurgical, Farmington, Conn., 40 micron porous metal disk) and the top clamp of the sample chamber had a 3.175 mm diameter hole. Using the Capwin software version 6.74.70 the following parameters were set as specified in the table immediately below.

| Parameter | Set Point |
| --- | --- |
| maxflow (cc/m) | 200000 |
| bublflow (cc/m) | 100 |
| F/PT (old bubltime) | 40 |
| minbppres (PSI) | 0 |
| zerotime (sec) | 1 |
| v2incr (cts) | 10 |
| preginc (cts) | 1 |
| pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 3 |
| aveiter | 20 |
| maxpdif (PSI) | 0.1 |
| maxfdif (cc/m) | 50 |
| sartp (PSI) | 1 |
| sartf (cc/m) | 500 |

Fuel Water Separation Test

Figure 2:
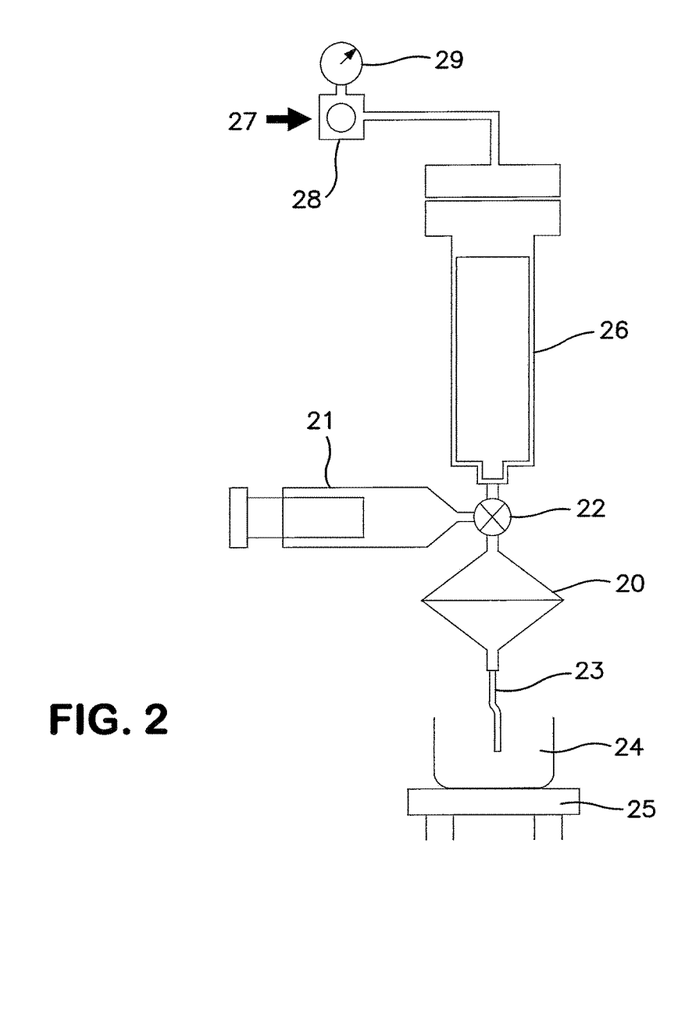
FIG. 2 is a schematic view of apparatus used to test examples and comparative examples herein.

Samples were die cut to 1 inch outer diameter using a mahew tools die punch and polyethylene cutting board. Single layer samples were loaded into an Advantec PP25 filter holder (available from Sterlitech, Kent, Wash.) or for multilayer samples into the modified Advantec PP25 filter holder with stainless steel cap screw closure illustrated in FIG. 1. Specifically, in the illustrated test set-up, the sample (as illustrated, non-woven 10 adjacent to but separated by annular gasket 12 from ePTFE laminate 11) is clamped by cap screws 18 between stainless steel closure 15 and support screen 16 (Advantec 540101) and outlet base 17 (Advantec 540103). An inlet cap (Advantec 540102) and O-ring (Advantec 540107) are disposed above the test sample. For multilayer samples annular gaskets of GORE® GR Sheet Gasketing (available from W.L. Gore and Associates, Newark Del.) were used to seal the samples with the gasket between the layers stacked to a thickness exceeding 1.5 mm. The sample filter holder 20 was then attached to the apparatus illustrated in FIG. 2. The filter holder 20 with tube 23 submerged in fuel in beaker 24 was attached to a three way valve 22 (Coleparmer EW-3120080, available from Coleparmer, Vernon Hills, Ill.). The valve 22 was connected to a water filled pressure reservoir 26 (Integrated Dispensing solutions PNs 8880297 and 8880365 available from integrated Dispensing Solutions, Agoura Hills, Calif.) and a diesel filled syringe 21 (Coleparmer EW073964). The reservoir 26 was manually pressurized with compressed air using a marsh bellowfram type 41 regulator 28 (Coleparmer P/N: EW6882522) fed with 100 psi house compressed air 27 and the pressure was monitored using a pressure gauge 29 off the regulator with a digital read out while mass output was monitored via an electronic balance 25 with 4 kg capacity and 0.1 g readability. The three-way valve 22 was turned open to the syringe 21 and filter holder 20, but closed to the water reservoir 26. Samples were then manually flushed with 10 ml of diesel fuel with interfacial tension against water=21 mN/m, viscosity 3.02 centipoise, density=0.829 g/cm$^3$ (purchased from Shell Service Station #57543696405, Elkton Md.). The three-way valve 22 was then turned open to the water reservoir 26 and filter 20 but closed to the diesel syringe 21. Then using the regulator 28 the water reservoir 26 was pressurized to 1.5 psi with compressed air 27. Samples which did not exhibit continuous water flow based on observed mass increase were considered to pass this test. Those samples that exhibited continuous water flow were considered to fail.

Particle Clogging Test

Figure 3:
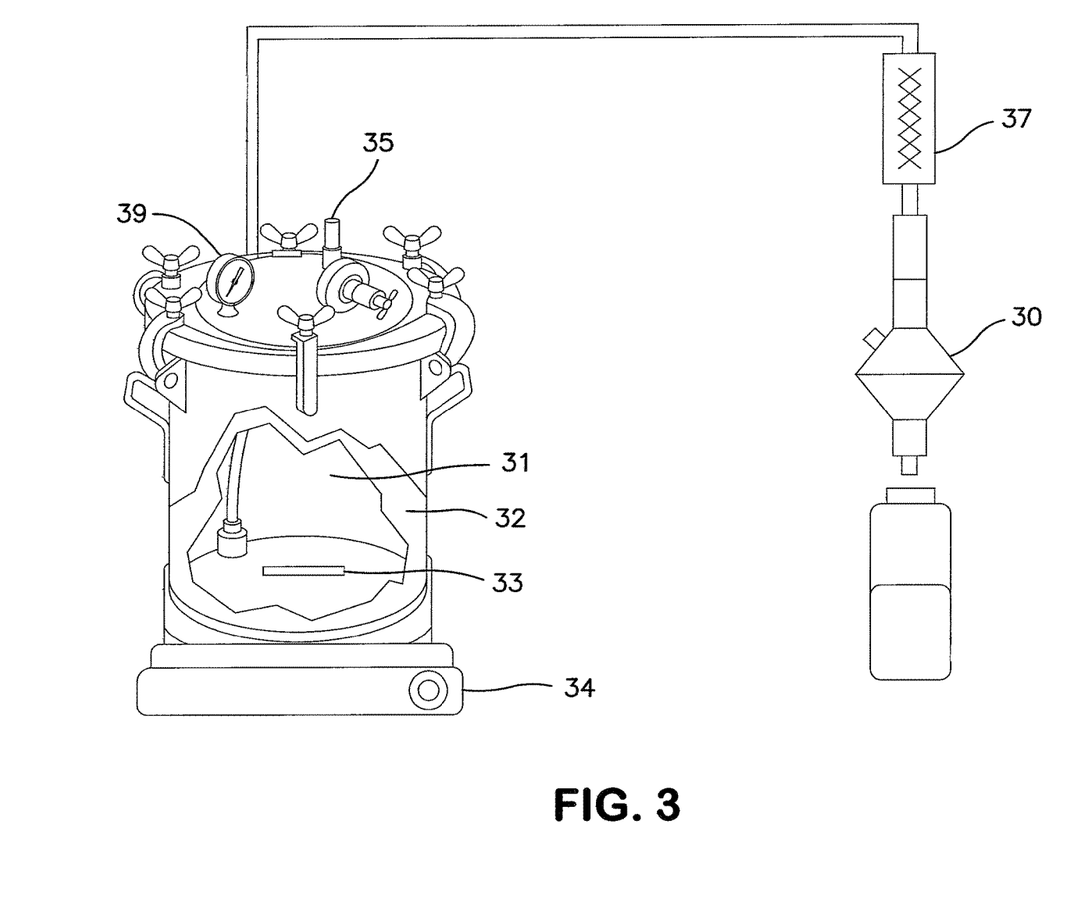
FIG. 3 is a schematic view of apparatus used to test examples and comparative examples herein.
Figure 4:
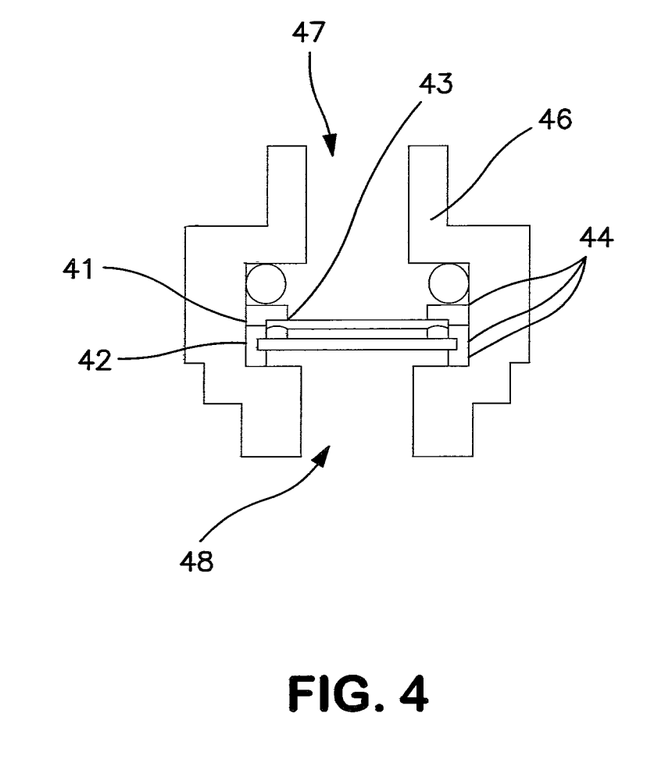
FIG. 4 is a side cross-sectional view of another exemplary embodiment of the present invention.

To simulate a lifetime field exposure to dirt and dust, the filter media samples were challenged at a constant pressure of 4 PSI with 0.35 liters of a slurry of dust. Failure to complete filtration of said dust slurry in 15 minutes indicates the filter has clogged. The filter was challenged in the apparatus depicted in FIG. 3. The test dust slurry was made by first dissolving a surfactant Glycerol Monoloeate PN G1017 CAS 25496-72-4 (available from Spectrum Chemical, Gardena, Calif.) at a concentration of 1000 ppm in diesel fuel with initial interfacial Tension against water=21 mN/m, viscosity 3.02 centipoise, density=0.829 g/cm$^3$ (purchased from Shell Service Station #57543696405, Elkton Md.) in test fuel reservoir 31, which comprised a glass beaker 32 with a Teflon magnetic stir bar 33, all on a magnetic stir plate 34. Then 150 mg ISO A1 fine grade test dust Powder Technology Incorporated grade ISO 12103-1 (available from Powder Technology Incorporated, Burnsville, Minn.) was suspended in the surfactant laden fuel. The surfactant is necessary to stabilize the test dust and prevent aggregation. Separate light scattering measurements of volume particle size distribution using Malvern Insitec L (available from Malvern Instruments, Westborough, Mass.) show liquid suspended particle size distributions matching the manufacturers published distribution (http://www.powdertechnologyinc.com/products/test-dust/test-dust.php). Test dust was challenged into circular 47 mm Pall/Gellman 2220 sample filter holder 30 (available from Optics Planet, Northbrook, Ill.) with a luer adapter omega FT612 and stopcock omega FT6021 replacing the vent screw (available from Omega, Stamford, Conn.). For the tests, samples were constructed as illustrated in FIG. 4. Three discs of 2 mm ultra thin THV 44 were die cut to outer diameter of 1 ⅞ inches and inner diameter 1 3/16 inches. Two discs of double sided tape McMasterCarr 77185824 (available from McMasterCarr, Princeton, N.J.) with thickness 0.25 mm were die cut with outer diameter 1 ⅞ inches and inner diameter 1 3/16 inches. The following stack was also made from top to bottom: THV 44, Tape, non-woven filter layer 41, o-ring 43, THV 44, ePTFE laminate 42, tape, THV 44. The o-ring used was McMastercarr part number 9262K689 metric buna-N o-ring, 2 mm width, 35.5 mm ID. The entire sample was then placed in a press Carver Hydraulic unit model #3393 with S/N number 3393-696. The sample was placed between two metal plates, and then placed inside the press. The applied load to the sample was 10,000 lbs for 1 minute. The sample was immediately removed from the press. The sample was allowed to cool for 1-2 minutes on the metal plate. The sample was then removed from the plate. A seal was then seen between the top THV layer and the bottom THV layer. THV specifications—THV ultra thin 221 Dureflex Roll No-U8CF003914, Product PT 9101A NTB NATS, P/O 10624266, S/O 40989 (available from Bayer Material Science, Whatley, Mass.). This composite sample was then placed in a filter holder 46 with an inlet 47 and an outlet 48. The press was heated to 175 degrees F. Sample geometry of samples prepared this way is depicted in FIG. 4. Note separation distance between the non-woven layer and ePTFE laminate layer was greater than 1.5 mm for all samples. For single layer samples annular gaskets of GORE® GR Sheet Gasketing (available from W.L. Gore and Associates, Newark Del.) with inner diameter of 1 3/16 inches were used to seal the samples. The dust fuel slurry was suspended with constant stirring in a 3.5 L glass beaker 32 and this was placed inside a pressurizeable paint tank. The tank was pressurized with a bellowfram type 41 regulator Coleparmer: EW6882522 fed with 100 PSI house compressed air 35. Pressure was monitored using a pressure gauge 39. The filter holder 30 was attached to the can via a nylon braid reinforced PVC tubing ¼ inch inner diameter with an inline static mixer 37 (Coleparmer EW0466714). Samples which completed filtration of the test liquid with 150 mg of dust through the filter 1/16 inch diameter filter area (16.48 milligrams per square centimeter) with out clogging were considered to pass the test. Those that did not were considered to fail.

Particle Cleanliness Test

Sample filters were challenged with a slurry of ISO A3 test dust Powder Technology Incorporated grade ISO 12103-3 in MIL PRF-5606H super clean petroleum base hydraulic fluid Royco 756 (Anderson Specialty Chemical, Hanover N.J.). Test dust was dispersed in the fluid at a concentration of 100 mg/ml and the same apparatus used for the particle clogging test was used here to filter the fluid at a pressure of 2 psi. For this test laminate and non-woven samples were die cut to 1⅞ or 1.5 inch outer diameter and a 1 3/16 inner diameter annular gasket. The dust concentration represents typical load of dust expected for ~1000 gallons of typical diesel fuel at typical ISO 22/21/18 ISO coding (see for example Debra Wilfong, Andrew Dallas, Chuanfang Yang, Philip Johnson, Karthik Viswanathan, Mike Madsen, Brian Tucker and John Hacker, Donaldson Company, EMERGING CHALLENGES OF FUEL FILTRATION in FILTRATION volume 10 no 2, 2010, pp 105-115 ISSN 1479-0602). The base fluid and filtrate from these tests was analyzed at SouthWest Research Institute (San Antonio, Tex.) via the accepted standard particle cleanliness test ISO 4406—Method for coding the level of contamination by solid particles. The particle counting analysis of the samples was achieved using a PAMAS NCB LD 50/50 particle counter (available from PAMAS USA, Tulsa, Okla.)

Water Clogging Test

Figure 5:
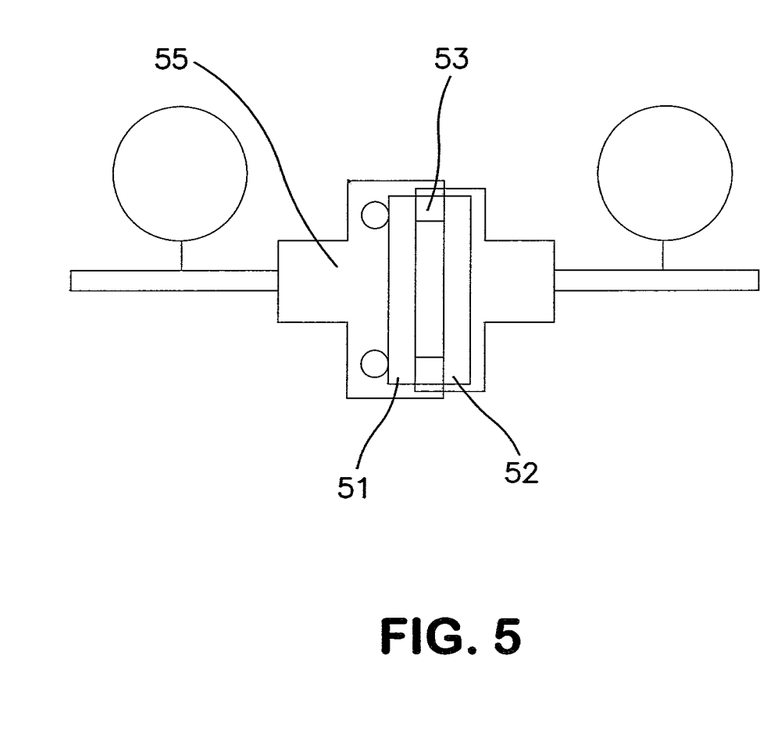
FIG. 5 is a side cross-sectional view of another exemplary embodiment of the present invention.

With reference to FIG. 5, samples including ePTFE laminate 52 and nonwoven layer 51 were die cut to a 1.75 inch outer diameter discs. 0.25 mm thick polyethylene double sided adhesive McMastercarr 77185824 (available from McMasterCarr, Princeton, N.J.) was stacked and die cut to annular gaskets 53 with 1.75 inch outer diameter, 1.5 inch inner diameter and varying thicknesses. Stacks of ePTFE-gasket-nonwoven (ePTFE face upstream) were assembled in the bottom half of a fuel flooded Stainless Steel Pall/Gelman 2220 holder 55 and holder 55 was tightened shut. The sample holder 55 shown in FIG. 5 was then mounted in a water in fuel emulsion challenge apparatus and primed to remove air and equilibrate flow with fuel only flow at 60 ml/min. Samples were then challenged at a constant flow rate of 60 ml/min with constant addition of finely emulsified water at a concentration of ~2000 ppm (as determined by Karl fisher titration) in diesel fuel with initial interfacial Tension against water=21 mN/m, viscosity 3.02 centipoise, density=0.829 g/cm$^3$ (purchased from Shell Service Station #57543696405, Elkton Md.) with glycerol monoleate added to reduce the fuel water interfacial tension to 13 mN/m. All tested samples were observed to provide excellent water separation as evidence by taking turbid feed (typical Karl Fischer titration values ~2000 ppm water) and producing clear and bright filtrate (typical Karl Fischer values under 100 ppm). Time from the start of emulsified water challenge and the differential pressure across the test filters was monitored for up to 15 minutes. Tests were terminated when samples were observed to clog as indicated by a 5 psi increase in differential pressure.

The fine fuel in water emulsions were produced in a fashion similar to ISO 16332 by injecting water through a 30 gauge needle ahead of a calibrated orifice Water Emulsifying Device Assembly TS16332-SD (available from International Filter Testing Services [IFTS], Inc, Springfield N.J.) with a 0.8 mm aperture operated at a differential pressure of 45 psi supplied by high rpm pumping with a gear pump (Coleparmer S7300404). A small slip stream of this was used for the filter challenge with constant flow regulated by a pump (Cole Parmer masterflex 751810 head). The drop size of the challenge was determined to be between 12-28 um (Dv 50 volumetric mean diameter=12.23 □m, D[3][2] sauter diameter 4.57 □m, Dv 90 volumetric diameter=28.83) by diverting flow from the vent line on the upstream face of the filter holder to a Malvern Insitec L particle size analyzer with a 0.5 mm optical path length flow cell. Analysis was made using the software RT Sizer version 7.4 with input refractive index of 1.44 for diesel fuel and 0.00+0.1i for water. Samples were considered to pass the test if they did not clog in 15 minutes of the test time. Those that clogged within 15 minutes were considered to fail the test. SAEJ1488 Emulsified Water Fuel Separation Test (revision 22 Oct. 2010)

SAE J1488 tests were performed at SouthWest Research Institute the San Antonio Tex. The test is described in the SAE standard document, but briefly the filter is challenged with a consistent water emulsion from a slip stream taken from an emulsion production loop utilizing a centrifugal pump to generate the emulsion. Upstream and downstream water content during the test are determined by Karl Fisher titration and separation is calculated based on measured upstream and down stream water contents corrected for dissolved water background. Testing is run for 150 minutes or until downstream water content reaches upstream water content. The tests were conducted per the standard with the exception that water content of the challenge was 1500-2000 ppm. In addition the test was run at a flow rate of 160 L/H, and the test fuel employed was clay treated ultralow sulfur diesel fuel with glycerol mono-oleate added at ~800-1000 ppm to reduce the fuel water interfacial tension to 9+/−1 mN/m. Also challenge droplet size was measured between 2-10 um (Dv 50 volumetric mean diameter=3.45 □m, D[3][2] sauter diameter 2.17 □m, Dv 90 volumetric diameter=8.48) using a Malvern Insitec L particle size analyzer with a 0.5 mm optical path length flow cell. Analysis was made using the software RT Sizer version 7.4 with input refractive index of 1.44 for diesel fuel and 0.00+0.1i for water.

Viscosity Measurement

Viscosity was measured using a Brookfield DVII+ viscometer with a UL low volume spindle and tube accessory. Viscosities are reported in centipoise (cP) for a temperature of 22.5 degrees Celsius, at 100 RPM, Viscosities were read after five minutes at 100 RPM for samples which had previously been run at the maximum RPM allowed by torque.

Sample Materials

Example 1

A disc was die cut from a non-woven filter media layer comprised of Lydall Lypore 9221-A/A a filter media comprised of wet-laid microglass and polyester spunbond. Lypore 9221-A/A is characterized by a manufacturer reported 6 mm mean flow pore size, 48 lbs/3000 sqft basis weight, and 16 mil thickness, and air flow resistance of 15 mm of water column. A disc was die cut from membrane laminate (part number LM10406, available from W.L. Gore & Associates, Inc., Newark, Del.), which is microporous ePTFE membrane bonded to a polyester nonwoven. The resulting ePTFE laminate has air permeability of 1 Frazier, thickness of 0.19 mm, basis weight of 77 grams per square meter, PMI determined bubble point of 11.4 psi and PMI determined largest pore size 0.9 microns. The materials were fixed in the respective sample holder in the configuration upstream-nonwoven-gasket-ePTFE laminate—downstream as described for the respective tests.

Example 2

A disc was die cut from a non-woven filter media layer comprised of Johns Manville DW40014003 a fine fiber PBT meltblown and Ahlstrom 220-PSFFL-A filter media comprised of polyester microfibers and a cellulose microglass wetlaid composite cured with a phenol formaldehyde resin. The material has manufacturer reported specifications of basis weight of approximately 166 lb/3000 ft$^2$, a 36 mil thickness, a 1.2 frazier air permeability, and 60 psi cured burst strength. A disc was die cut from microporous ePTFE membrane laminate described in Example 1. The materials were fixed in the respective sample holder in the configuration upstream-nonwoven-gasket-ePTFE laminate—downstream as described for the respective tests.

Example 3

A disc was die cut from a non-woven filter media layer comprised of a polypropylene fine fiber meltblown 30 grams per square meter basis weight and Neenah Gessner K13B50A filter media comprised of a 50 g/m$^2$ polyester meltblown and a wet-laid cellulose paper layer impregnated with a phenolic resin. K13B50A is characterized by a 13 mm mean flow pore size, 285 grams per square meter basis weight, and 0.75 mm thickness, and air flow of 8 L/m$^2$s at 200 Pascal. A disc was die cut from microporous ePTFE membrane laminate, described in Example 1. The materials were fixed in the respective sample holder in the configuration upstream-nonwoven-gasket-ePTFE laminate-downstream as described for the respective tests.

Example 4

A disc was die cut from a non-woven filter media layer comprised of three layers of polyester nonwovens from Johns Mannville with the respective part numbers DW 6014003, DW 6014044, DW 406 respectively. A disc was die cut from microporous ePTFE membrane laminate as described in Example 1. The materials were fixed in the respective sample holder in the configuration upstream-nonwoven-gasket-ePTFE laminate—downstream as described for the respective tests.

Example 5

A disc was die cut from a non-woven filter media layer comprised of Lydall Lypore 9221-A/A described in example 1. A disc was die cut from microporous ePTFE membrane laminate part number LXP10029 L#9493412, available from W.L. Gore & Associates, Inc. (Newark, Del.). The ePTFE laminate is a composite of ePTFE on a nonwoven comprised of polyester spunbond and polypropylene meltblown layers. The resulting ePTFE laminate has air permeability of 3 Frazier, thickness of 0.85 mm, basis weight of 273 grams per square meter, PMI determined bubble point of 4.2 psi and PMI determined largest pore size 2.5 microns.

The materials were fixed in the respective sample holder in the configuration upstream-nonwoven-gasket-ePTFE laminate-downstream as described for the respective tests.

Example 6

A disc was die cut from a non-woven filter media layer comprised of Lydall Lypore 9221-A/A described in Example 1. A disc was die cut from microporous ePTFE membrane laminate part number LXP10029 L#9493314, available from W.L. Gore & Associates, Inc. (Newark, Del.). The ePTFE laminate is a composite of ePTFE on a nonwoven comprised of polyester spunbond and polypropylene meltblown layers. The resulting ePTFE laminate has air permeability of 3.2 Frazier, thickness of 0.85 mm, basis weight of 259 grams, PMI determined bubble point of 3.58 psi and PMI determined largest pore size 3 microns. The materials were fixed in the respective sample holder in the configuration upstream-nonwoven-gasket-ePTFE laminate—downstream as described for the respective tests.

Examples 7-8

A disc was die cut from a non-woven filter media layer comprised of Neenah Gessner K13B50A described in Example 3. A disc was die cut from microporous ePTFE membrane laminate, described in Example 1. The materials were fixed in the respective sample holder in the configuration upstream-nonwoven-gasket-ePTFE laminate—downstream as described for the respective tests.

Example 9

Figure 6A:
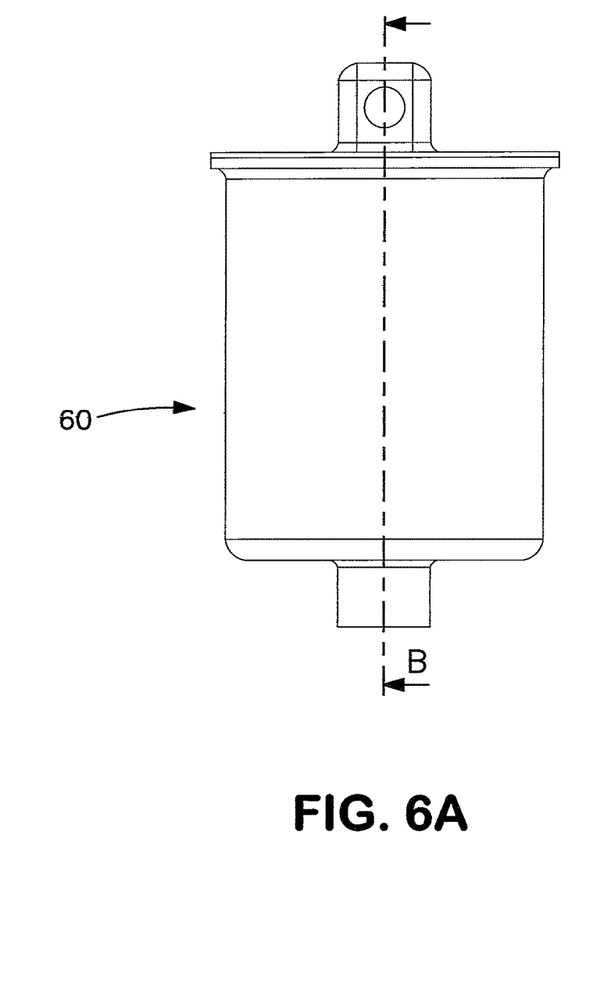
FIG. 6A is a side view of another exemplary embodiment of the present invention.
Figure 6B:
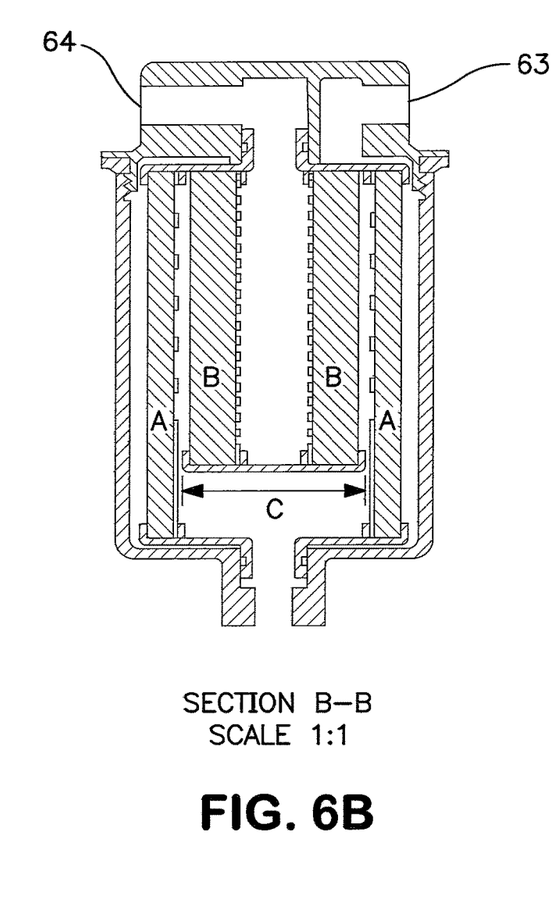
FIG. 6B is a side cross-sectional view of the exemplary embodiment of FIG. 6A.

A prototype filtration device comprised of a first filter media layer comprised of Ahlstrom 220PSFFLA nonwoven filter media arranged in an annular pleat pack, and a second hydrophobic layer comprised of the ePTFE laminate of Example 5 in an annular pleat pack nested inside the interior of the non-woven pleat pack. The outer annular pleat pack (A in FIG. 6) of Ahlstrom 220PSSFL-A had a pleat height of 106 mm, a pleat depth of 7.5 mm, and a pleat count of 55 with an effective area after potting of 0.065 square meters. The inner pleat pack (B in FIG. 6) of microporous ePTFE membrane laminate had a pleat height of 85 mm, a pleat depth of 13.5 mm, and a pleat count of 56 with an effective area after potting of 0.103 square meters. Pleat packs were seam sealed using an epoxy (JB quick weld). The assembled device having a V/SA separation between layer 1 and layer 2 of 3 mm based on the minimum separation between the layers illustrated in FIG. 6. The overall device assembled as in FIG. 6. The solid components (all hashed elements in FIG. 6B except for A and B) of the device were stereolithographically rendered from the transparent resin Somos Watershed 11120 (DSM) and the pleat packs sealed into their respective caps by potting with a two component polyurethane. Dimensions in FIG. 6 scale to dimension of the bottom end cap of the inner pleat pack C in the figure (C=5.6 cm). Viton o-rings were used to accomplish seal of the outer shell and the mating seals of the inlet 63 and outlet 64 endcaps of pleat pack A to the solid outer shell 60. The flowpath in this example is inlet 63-A-B-outlet 64.

Comparative Example 1

A disc was die cut from a non-woven filter media layer comprised of Lydall Lypore 9221-A/A (as previously described in Example 1).

Comparative Example 2

A disc was die cut from a non-woven filter media layer comprised of Johns Manville DW6014003 fine fiber pbt meltblown and Ahlstrom 220PSFFL-A (as previously described in Example 2).

Comparative Example 3

A disc was die cut from a non-woven filter media layer comprised of polypropylene fine fiber meltblown 30 grams per square meter basis weight and Neenah Gessner K13B50A (as previously described in Example 3).

Comparative Example 4

A commercial two stage water filter separator Mahle KL490 was obtained. The filter is comprised of an outer coalescent nonwoven media pleated with an inner woven screen media sealed to apertures in a solid inner core. The outer pleated media is approximately 0.07 square meters with eighty 3.5 cm tall pleats at a 1.5 cm pleat depth. The media is a ~1.13 mm thick composite comprised of a multilayer composite of fine fiber polyester nonwoven and wet-laid cellulose non-woven. The woven media on the element core is a hydrophobic screen with a fiber diameter of 30 microns, a 60 micron thickness, a mesh opening of approximately 20 microns, of approximately 282 picks per inch, and a surface finish provided by a fluorinated coating. For this example a 1.4 inch diameter disc was die cut from the first layer of nonwoven coalescent media.

Comparative Example 5

A commercial two stage water filter separator Mahle KL228 was obtained. The filter is comprised of an outer coalescent nonwoven media pleated with an inner woven screen media sealed to apertures in a solid inner core. The outer pleated media is approximately 0.178 square meters with one hundred and forty six, 3.5 cm tall pleats at a 1.75 cm pleat depth. The media is a ~1.13 mm thick composite comprised of a multilayer composite of fine fiber polyester nonwoven and wetlaid cellulose non-woven. The woven media on the element core is a hydrophobic screen with fiber diameter of 25 microns, a 50 micron thickness, a mesh opening of approximately 20 microns, of approximately 363 picks per inch, and a surface finish provided by a fluorinated coating. For this example a disc was die cut from the first layer of nonwoven coalescent media.

Comparative Example 6

A commercial two stage water filter separator Beck-Arnley 043-1057 was obtained. The filter is comprised of an outer coalescent nonwoven media pleated with an inner woven screen media heat sealed to apertures in a solid inner core. The outer pleated media is approximately 0.11 square meters with 78, 4 cm tall pleats at a 1.75 cm pleat depth. The media is a ~0.64 mm thick composite comprised of a multilayer composite of fine fiber polyester nonwoven and wetlaid cellulose non-woven. The woven media on the element core is a hydrophobic screen with fiber diameter of 53 microns, a 70 micron thickness, a mesh opening of approximately 88 microns, of approximately 131 picks per inch, and a surface finish provided by a fluorinated coating. For this example a disc was die cut from the first layer of nonwoven coalescent media.

Comparative Example 7

A piece of the woven mesh described in comparative example 4 was mounted in the filter holder using an annular gasket of Gore-Tex® GR sheet outer diameter equal to 1 inch and inner diameter equal to 0.25 inch.

Comparative Example 8

A 47 mm disk of a woven polyester screen Spectrapore P/N:145832, a 15 micron mesh size (available from Spectrum Labs, Rancho Dominguez, Calif.). This screen was dip coated in a solution of a fluoroacrylate polymer as described in U.S. Pat. No. 5,462,586 dissolved in perfluoroheptane PF5070 (3M, Minneapolis, Minn.) and allowed to oven dried 1 hour at 100° prior to testing.

Comparative Example 9-14

A disc was die cut from a non-woven filter media layer comprised of Neenah Gessner K13B50A (as previously described in Example 3). The materials were fixed in the respective sample holder in the configuration upstream—nonwoven-gasket-ePTFE laminate-downstream.

Comparative Example 15

A disc was die cut from microporous ePTFE membrane laminate, part number LM 10406 (as previously described in Example 1).

Comparative Example 16

A disc was die cut from the first layer of nonwoven coalescent media from a Mahle KL490 (as previously described in comparative Example 4). A disc was die cut from microporous ePTFE membrane laminate LM 10406, as previously described in Example 1. The materials were fixed in the respective sample holder in the configuration upstream-nonwoven-gasket-ePTFE laminate—downstream as described for the respective tests.

Comparative Example 17

A disc was die cut from the first layer of nonwoven coalescent media from a Beck-Arnely 043-1057 described in comparative Example 6. A disc was die cut from microporous ePTFE membrane laminate LM 10406, as previously described in Example 1. The materials were fixed in the respective sample holder in the configuration upstream-nonwoven-gasket-ePTFE laminate—downstream as described for the respective tests.

Comparative Example 18

A disc was die cut from the nonwoven media as previously described in example 4.

Crossflow Test Results Discussion

A microporous ePTFE membrane laminate, described in Example 1, available from W.L. Gore & Associates, Inc, (Newark, Del.) was supplied to Filtration Solutions Incorporated (Hackettstown, N.J.). The laminate was fabricated into a spiral wound crossflow module with a 1.5 inch outer diameter Filtration Solutions Incorporated PN SM1.5-10 with a filter area of 0.21 $m^2$. The sample was tested to the ISO19438 standard within the manufacturer's recommended operating conditions for crossflow at SouthWest Research Institute with a crossflow velocity of 2.7 L/min and permeate flow limited by a down stream pump to 1 L/m. The ISO 19438 test challenges the filter with 50 mg/ml of ISO A3 test dust suspended in Mil-H PRF test fluid. Despite the sweeping crossflow on the membrane surface the module rapidly clogged in under ten minutes with less than $1/10$ the dust holding capacity of a commercial filter Mahle KL 228 of a construction described in detail in example 5.

Discussion of Water Separation Test Results

Samples described in examples 1-6 and comparative examples 1-9 were evaluated in the water separation test described above. Results of the test are shown in TABLE I below.

| Example | Non-woven | Microporous Hydrophobic Film | Water Separation Test Result |
|---|---|---|---|
| Example 1 | Lypore 9221-A/A | ePTFE Laminate LM10406 | Pass |
| Example 2 | JohnsManville DW6014003, Ahlstrom 220-PSFFL-A | ePTFE Laminate LM10406 | Pass |
| Example 3 | PP Meltblown and Neenah KB15B50A | ePTFE Laminate LM10406 | Pass |
| Example 4 | JohnsManville DW6014003, DW 6014044, DW406 | ePTFE Laminate LM10406 | Pass |
| Example 5 | Lypore 9221-A/A | ePTFE Laminate LXP10029 L#9493412 | Pass |
| Example 6 | Lypore 9221-A/A | ePTFE Laminate LXP10029 L#9493314 | Pass |
| Comparative Example 1 | Lypore 9221-A/A | None | Fail |
| Comparative Example 2 | Ahlstrom 220-PSFFL-A | None | Fail |
| Comparative Example 3 | Neenah KB13B50A | None | Fail |
| Comparative Example 4 | Mahle KL490 | None | Fail |
| Comparative Example 5 | Mahle KL228 | None | Fail |
| Comparative Example 6 | Beck-Arnely 043-1057 | None | Fail |
| Comparative Example 7 | None | Mahle KL 490 20 micron mesh woven | Fail |
| Comparative Example 8 | None | Spectropore 15 micron mesh woven with flourinated coating | Fail |

As can be seen from table 1 the inventive composites comprised of a nonwoven layer, a fixed separation distance and microporous hydrophobic membrane described in example 1-6 resist water penetration thus separating fuel from water. In contrast the comparative examples 1-8 do not resist water penetration or separate water from fuel. More specifically comparative examples 1-3 show that the nonwoven layers alone do not resist water penetration. Furthermore comparative examples 4-9 show that despite their hydrophobicity coalescent media from commercial filters and hydrophobic woven screens do not resist water penetration or reject water from fuel.

Discussion of Water Clogging Test Results

Samples described in examples 7-8 and comparative examples 3, 10-14 were evaluated in the water clogging test described above. Results of the test are shown in TABLE 2 below.

|  | Description | | | Water Clogging |
|---|---|---|---|---|
| Example | Non-woven | Microporous Hydrophobic Film | V/SA (mm) | Test Result |
| Example 7 | Neenah K13B50A | ePTFE Laminate LM10406 | 3 | Pass |
| Example 8 | Neenah K13B50A | ePTFE Laminate LM10406 | 2 | Pass |
| Comparative Example 3 | Neenah K13B50A | none | NA | Pass |
| Comparative Example 9 | Neenah K13B50A | ePTFE Laminate LM10406 | 1.5 | Fail |
| Comparative Example 10 | Neenah K13B50A | ePTFE Laminate LM10406 | 1 | Fail |
| Comparative Example 11 | Neenah K13B50A | ePTFE Laminate LM10406 | 0.75 | Fail |
| Comparative Example 12 | Neenah K13B50A | ePTFE Laminate LM10406 | 0.5 | Fail |
| Comparative Example 13 | Neenah K13B50A | ePTFE Laminate LM10406 | 0.25 | Fail |
| Comparative Example 14 | Neenah K13B50A | ePTFE Laminate LM10406 | 0 | Fail |

Table 2 shows inventive composites of examples 7 and 8 comprised of a nonwoven layer, a V/SA separation of greater than 1.5 mm and a microporous hydrophobic membrane do not clog with water. In contrast, similar composites described in comparative examples 9-14 having a volume area separation distance of less than 1.5 mm clog with water. Furthermore comparative examples 3 shows that the nonwoven layer alone passes water and is not clogged in this test. Thus it is clear that for the inventive composites described, separation distance between the hydrophobic film and non-woven is critical to avoid water clogging.

Discussion of Particle Clogging Test Results

Samples described in examples 1-4 and comparative examples 1, 2, 3, 4, 6, 15, 16, 17 were evaluated in the particle clogging test described above. Results of the test are shown in TABLE III below.

Table 3 shows inventive composites described in examples 1-4 comprised of a nonwoven layer, a fixed volume/area separation distance and a microporous hydrophobic membrane provide durable particle filtration and are not clogged by a particle challenge representative of a real world diesel fuel lifetime exposure to particles. In contrast, comparative examples 16 and 17 clog and this shows that composites of typical coalescent media do not function in the same way as the inventive nonwovens to prevent clogging and provide durable or reliable separation. Comparative example 15 illustrates that the concept of a hydrophobic microporous ePTFE membrane alone clogs and does not provide durable separation. Comparative examples 1-5 provide controls showing that neither the inventive nonwoven materials alone nor the prior art coalescers alone are responsible for the observed clogging behavior and loss of durability.

Discussion of Particle Cleanliness Test Results

Samples described in comparative examples 1, 2, 3, 4 and 18 were evaluated in the particle cleanliness test described above. Results of the test are shown in TABLE 4 below

|  | Description | | Volume Filtered | Particle Clogging |
|---|---|---|---|---|
| Example | Non-woven | Microporous Hydrophobic Film | (ml) | Test Result |
| Example 1 | Lypore 9221-A/A | ePTFE Laminate LM10406 | 350 | Pass |
| Example 2 | Johns Manvile DW6014003, Ahlstrom 220-PSFFL-A | ePTFE Laminate LM10406 | 350 | Pass |
| Example 3 | PP Meltblown and Neenah KB15B50A | ePTFE Laminate LM10406 | 350 | Pass |
| Example 4 | JohnsManville SW6014003, DW 6014044, DW406 | ePTFE Laminate LM10406 | 350 | Pass |
| Comparative Example 1 | Lypore 9221-A/A | None | 350 | Pass |
| Comparative Example 2 | Johns Manvile DW4014003, Ahlstrom 220-PSFFL-A | None | 350 | Pass |
| Comparative Example 3 | Neenah K13B50A | None | 350 | Pass |
| Comparative Example 4 | Mahle KL490 | None | 350 | Pass |
| Comparative Example 6 | Beck-Arnely 043-1057 | None | 350 | Pass |
| Comparative Example 15 | none | ePTFE Laminate LM10406 | 170 | Fail |
| Comparative Example 16 | Mahle KL490 | ePTFE Laminate LM10406 | 122 | Fail |
| Comparative Example 17 | Beck-Arnely 043-1057 | ePTFE Laminate LM10406 | 335 | Fail |

| Example | Non-woven | Microporous Hydrophobic Flim | ISO 4406 Code |
|---|---|---|---|
| Comparative Example 1 | Lypore 9221-A/A | None | 15/13/11 |
| Comparative Example 2 | Johns Manvile DW6014003, Ahlstrom 220-PSFFL-A | None | 17/15/11 |
| Comparative Example 3 | PP Meltblown and Neenah K13B50A | None | 17/15/11 |
| Comparative Example 4 | Mahle KL490 | None | 22/21/17 |
| Comparative Example 18 | JohnsManville DW6014003, DW 6014044, DW406 | None | 15/13/10 |
| Ultraclean Starting Fluid | NA | NA | 16/14/11 |

The media of comparative examples 1, 2, 3, and 18 tested without ePTFE and delivered filtrate with an ISO 4406 cleanliness level of 17/15/11 or better (e.g., having fewer than 1300 particles/ml >4 um, fewer than 320 particles/ml>6 um, and fewer than 20 particles ml>14 um) indicating that they are substantially particle free for larger particles with fuel cleanliness comparable to or better than the as manufactured test fluid. In contrast, comparative example 4 illustrates a typical coalescer material of the prior art which does not fulfill the particle cleanliness requirements of the non-wovens of the inventive composite delivering an ISO cleanliness code of 22/21/17. comparable to typical unfiltered diesel fuel e.g. an ISO cleanliness code of 22/21/17 (see for example Debra Wilfong, Andrew Dallas, Chuanfang Yang, Philip Johnson, Karthik Viswanathan, Mike Madsen, Brian Tucker and John Hacker, Donaldson Company, EMERGING CHALLENGES OF FUEL FILTRATION in FILTRATION volume 10 no 2, 2010, pp 105-115 ISSN 1479-0602).

Discussion of Emulsified Fuel Water Separation Test

Figure 7:
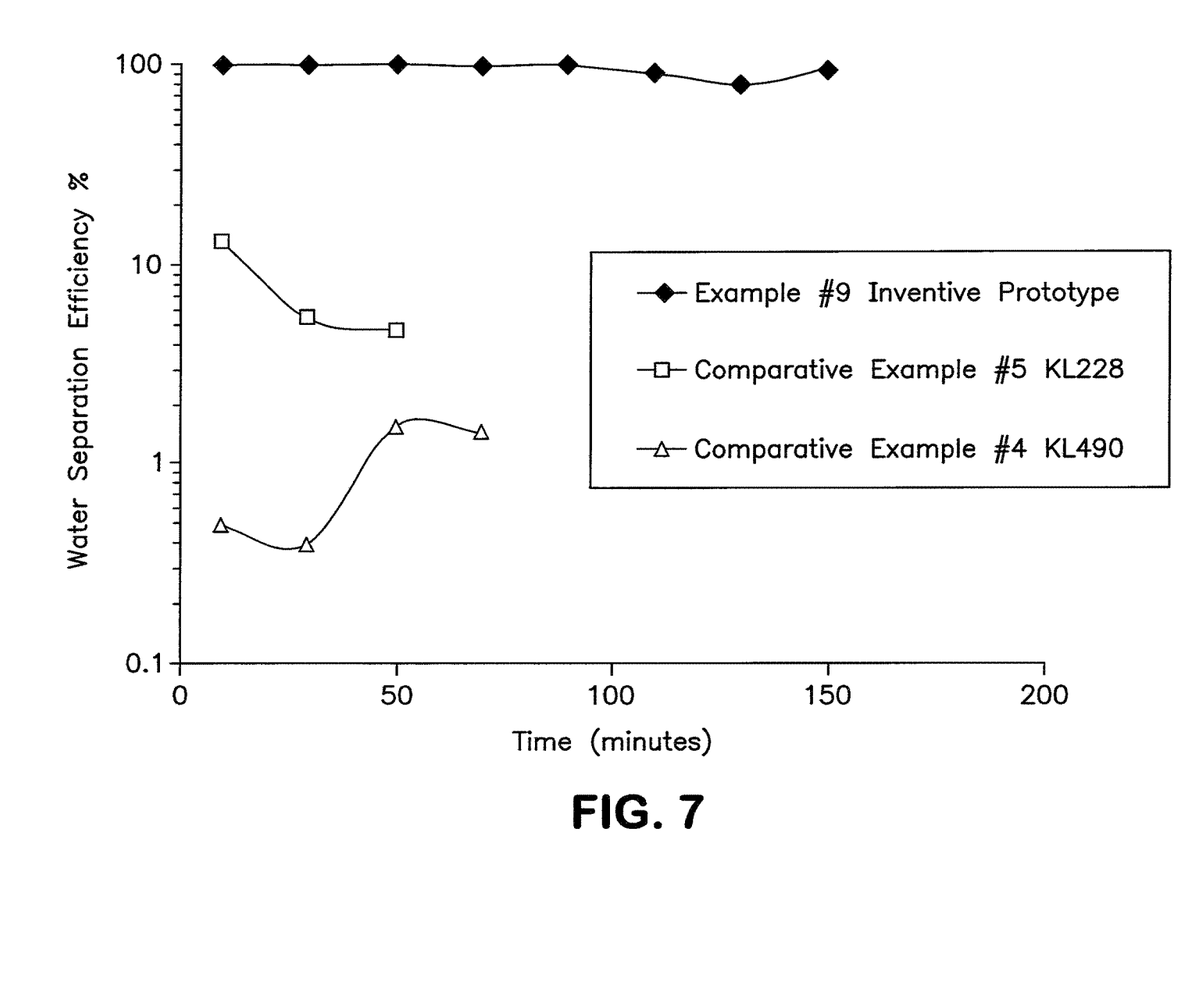
FIG. 7 is a graph depicting results of testing an example of the present invention and comparative examples.

SAE J1488 fuel water separation tests were conducted on the inventive composite device described in example 9 and commercial filters Mahle KL490, Mahle KL228 described in comparative example 4 and comparative example 5. Table 5 shows the average water separation efficiency and FIG. 7 shows the water separation efficiency determined in the test as a function of testing time. As seen in FIG. 7. the inventive composite exhibits durable high water separation efficiency for the duration of the test whereas the comparative examples passed water immediately and rapidly decayed to a level of water separation which was considered insignificant at which point testing was terminated. Furthermore results of the separation achieved using the inventive prototype example 9 were readily apparent via direct observation of turbid fuel input to the prototype and clear and bright fuel at the outlet.

TABLE 5

| Example | Description | Average Separation Efficiency |
|---|---|---|
| Example #9 | Inventive Prototype | 93% |
| Comparative Example #5 | Mahle KL 228 | Less than 8% |
| Comparative Example #4 | Mahle KL 490 | Less than 1% |

The invention claimed is:
1. A process for separating water from a water/diesel fuel mixture comprising the steps of:
 (a) providing a porous filter media layer;
 (b) filtering said mixture with said porous filter media such that the mixture is cleaned to have fewer than 1300 particles/ml >4 μm, fewer than 320 particles/ml >6 μm, and fewer than 20 particles/ml>14 μm;
 (c) providing a hydrophobic microporous layer; and
 (d) subsequent to said filtering step, using said hydrophobic microporous layer to remove water from said cleaned water/diesel fuel mixture at a water separation efficiency of at least 55%.
2. The process of claim 1 wherein said water separation efficiency is at least 65%.
3. The process of claim 1 wherein said water separation efficiency is at least 75%.
4. The process of claim 1 wherein said water separation efficiency is at least 85%.
5. The process of claim 1 wherein said water separation efficiency is at least 93%.
6. The process of claim 1 wherein said hydrophobic microporous layer comprises a microporous fluoropolymer membrane.
7. The process of claim 1 wherein said hydrophobic microporous layer comprises a composite of expanded polytetrafluoroethylene and a support.
8. The process of claim 1 wherein said hydrophobic microporous comprises a composite of expanded polytetrafluoroethylene and non-woven support.
9. The process of claim 1 wherein said porous filter media layer and said hydrophobic microporous layer are disposed in a flow path of said water/diesel fuel mixture such that a V/SA between the layers satisfies the relation

$$\frac{V}{SA} > \sqrt{\frac{C\mu}{\Delta\rho g}}$$

where V is the volume described by a body with a square or rectangular base defined by the filter area of the hydrophobic microporous layer and a height equivalent to either a minimum linear distance between the layers or an average distance of separation between the layers when a minimum separation distance is zero; SA is a filter surface area of geometric plane covering top most surface of the hydrophobic microporous layer; C is a numeric constant equal to 0.01238 (meters/second); μ is the dynamic viscosity of a fluid in (grams/meters second); g is the gravitational constant 9.8 (meter/second squared); and Δρ is the difference in density between a middle distillate fuel and a water phase in (gram/ cubic meter).
10. The process of claim 1, wherein the water/diesel fuel mixture comprises a surfactant.
11. The process of claim 10, wherein the water/diesel fuel mixture comprises about 2000 ppm water.
12. A multilayer porous composite for providing durable, non-clogging water separation in a flow path of a fuel with a microemulsion of water comprising:
 a. a filter media layer
 b. a hydrophobic microporous layer
 c. a separation V/SA between the layers that satisfies the relation $$\frac{V}{SA} > \sqrt{\frac{C\mu}{\Delta\rho g}}$$

where V is the volume described by a body with a square or rectangular base defined by the filter area of the hydrophobic microporous layer and a height equivalent to either a minimum linear distance between the layers or an average distance of separation between the layers when a minimum separation distance is zero; SA is a filter surface area of geometric plane covering top most surface of the hydrophobic microporous layer; C is a numeric constant equal to 0.01238 (meters/second); μ is the dynamic viscosity of a fluid in (grams/meters second); g is the gravitational constant 9.8 (meter/second squared); and Δρ is the difference in density between a middle distillate fuel and a water phase in (gram/ cubic meter).

13. The composite of claim 12 wherein the filter media layer is a non-woven.

14. The composite of claim 13 wherein the filter media layer is a non-woven which provides filtrate having fewer than 1300 particles/ml >4 μm, fewer than 320 particles/ml >6 μm, and fewer than 20 particles/ml >14 μm.

15. The composite of claim 14 wherein the filter media layer is a non-woven comprising fibers of cellulose.

16. The composite of claim 14 wherein the filter media layer is a non-woven comprising polyester meltblown fiber.

17. The composite of claim 14 wherein the filter media layer is a non-woven comprising microglass fiber.

18. The composite of claim 14 wherein the filter media layer is a non-woven comprising a combination of cellulose, polyester, and microglass fiber.

19. The composite of claim 14 wherein the filter media layer is a non-woven comprising a plurality of fiber layers.

20. The composite of claim 12 wherein the hydrophobic porous layer comprises a hydrophobic microporous membrane.

21. The composite of claim 20 wherein the hydrophobic porous layer comprises an expanded polytetrafluoroethylene membrane.

22. The composite of claim 21 wherein the hydrophobic porous layer comprises an expanded polytetrafluoroethylene membrane with largest pore size between 0.1 and 50 microns.

23. The composite of claim 20 wherein the hydrophobic porous layer comprises an expanded polytetrafluoroethylene membrane laminate.

24. The composite of claim 23 wherein the hydrophobic porous layer comprises an expanded polytetrafluoroethylene membrane laminated to a non-woven.

25. The composite of claim 24 wherein the hydrophobic porous layer comprises an expanded polytetrafluoroethylene membrane laminated to a fiber non-woven layer.

26. The composite of claim 24 wherein the expanded polytetrafluoroethylene membrane of the laminate precedes the non-woven in said flow path.

27. The composite of claim 23 wherein the laminate has a frazier permeability between 1-50, wherein the frazier permeability is the rate of flow of air in cubic feet per square foot of sample area per minute at a differential pressure drop across the laminate of 12.7 mm water column.

28. The composite of claim 23 wherein the laminate has a frazier permeability between 1-20, wherein the frazier permeability is the rate of flow of air in cubic feet per square foot of sample area per minute at a differential pressure drop across the laminate of 12.7 mm water column.

29. The composite of claim 23 wherein the laminate has a frazier permeability between 1-10, wherein the frazier permeability is the rate of flow of air in cubic feet per square foot of sample area per minute at a differential pressure drop across the laminate of 12.7 mm water column.

30. The composite of claim 12 where the V/SA is fixed by potting.

31. The composite of claim 12 where the V/SA is held fixed adhesive bonding.

32. The composite of claim 12 where the V/SA is held fixed by a solid spacer.

33. The composite of claim 12 wherein the V/SA between the layers satisfy the relation $$\frac{V}{SA} > 1.5 \text{ mm.}$$

34. The composite of claim 12 wherein the V/SA between the layers satisfy the relation $$\frac{V}{SA} > 2 \text{ mm.}$$

35. An automotive fuel filter comprising the composite of claim 12.

36. An aerospace fuel filter comprising the composite of claim 12.

37. A space craft fuel filter comprising the composite of claim 12.

* * * * *